(12) United States Patent
Shiomi et al.

(10) Patent No.: US 7,003,148 B2
(45) Date of Patent: Feb. 21, 2006

(54) DETECTION OF AN END POINT OF POLISHING A SUBSTRATE

(75) Inventors: Junichi Shiomi, Kyoto (JP); Hiroki Fujimoto, Kyoto (JP); Eiji Nishihara, Kyoto (JP); Atsushi Imamura, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 631 days.

(21) Appl. No.: 10/086,877

(22) Filed: Mar. 4, 2002

(65) Prior Publication Data

US 2002/0159626 A1  Oct. 31, 2002

(30) Foreign Application Priority Data

Mar. 16, 2001  (JP)  ............................. 2001-076055

(51) Int. Cl.
*G06K 9/00*  (2006.01)

(52) U.S. Cl. ............................ 382/141; 451/6; 438/14; 438/959

(58) Field of Classification Search ................ 382/141, 382/144–152; 451/6; 438/14, 692, 959
See application file for complete search history.

(56) References Cited

U.S. PATENT DOCUMENTS

| 5,433,651 | A  | * | 7/1995  | Lustig et al. | ................... 451/6 |
| 6,271,047 | B1 | * | 8/2001  | Ushio et al.  | ................... 438/14 |
| 6,399,501 | B1 | * | 6/2002  | Birang et al. | ............... 438/692 |
| 6,458,014 | B1 | * | 10/2002 | Ihsikawa et al. | ............... 451/6 |
| 6,753,972 | B1 | * | 6/2004  | Hirose et al. | ............... 356/630 |

FOREIGN PATENT DOCUMENTS

| JP | 9-131663 | 5/1997 |
| JP | 3001051  | 12/1999 |

* cited by examiner

*Primary Examiner*—Samir Ahmed
*Assistant Examiner*—Charles Kim
(74) *Attorney, Agent, or Firm*—McDermott Will & Emery LLP

(57) ABSTRACT

A two-dimensional image of a substrate surface targeted for polishing is periodically picked up, and the image is analyzed to obtain an entropy H1, H2 of the two-dimensional image. An end point of polishing is then determined according to the entropy H1, H2. Alternatively, other image characteristic value such as a difference statistic of the image may be employed instead of the entropy H1, H2.

6 Claims, 7 Drawing Sheets

*Fig. 2A* FORMING Cu LAYER
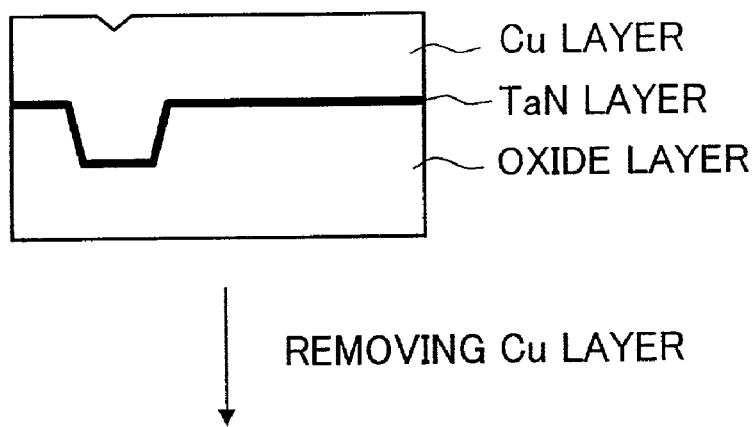
↓ REMOVING Cu LAYER
*Fig. 2B* FIRST CMP PROCESS
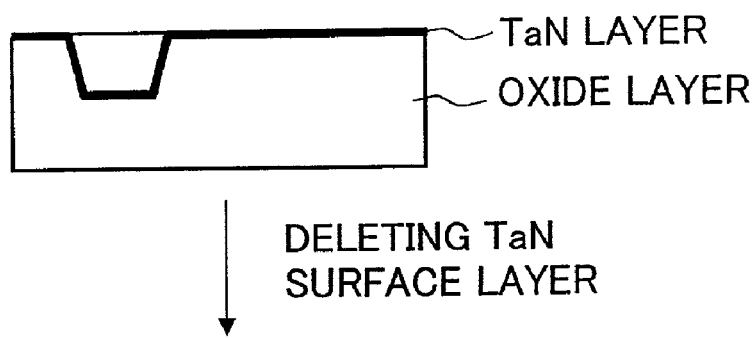
↓ DELETING TaN SURFACE LAYER
*Fig. 2C* SECOND CMP PROCESS
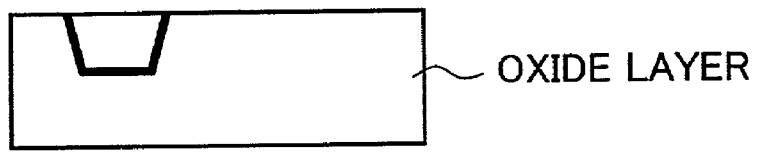

CALCULATION OF HISTOGRAMS G(i), P(i) USED IN DIFFERENCE STATISTIC OF GRAY IMAGE

HYSTOGRAM G(i):
Probability that an absolute value of a difference of image values D of two pixels separated by (NX, NY) has a value of i.

P(i) = G(i+1)

DETECTION OF AN END POINT OF POLISHING A SUBSTRATE

BACKGROUND OF THE INVENTION

1. Field of the Invention

The present invention relates to a technique for detecting an appropriate end point of a process for polishing a thin film formed on a substrate, such as a semiconductor wafer or a glass substrate for a liquid crystal display.

2. Description of the Related Art

Manufacturing of semiconductor devices or liquid crystal panels often includes a process for forming a thin film on a substrate and a process for polishing the film to attain an appropriate thickness. The polishing process must be stopped when an appropriate thickness is obtained. Accordingly, there have been proposed various techniques for detecting an end point of polishing. The substrate with a thin film formed there on is sometimes referred to as simply as "a substrate" in this specification.

For example, JP9-131663A discloses a technique for detecting an end point of polishing based on frictional force. In this technique, when an underlying layer of a thin film emerges as the polishing proceeds, the frictional force between the substrate and a polishing pad is changed to vary a torque required for rotating the substrate. The variation in the torque is detected as a variation in a current of a rotation motor to determine an end point of the polishing.

JP 3001051B discloses a technique for detecting an end point of polishing based on light reflectance. The technique detects an end point of polishing by irradiating laser light onto a substrate surface and then by measuring a variation in the reflectance.

However, in the conventional technique for detecting an end point of polishing based on frictional force, the frictional force is evaluated as an average of forces applied to the overall substrate surface, and there is no way to detect non-uniformity of the polishing in various locations on the substrate surface. In the technique for detecting an end point based on light reflectance, only a very small area is spotted with light and detected, and it is difficult to detect overall result of polishing on a wide area.

SUMMARY OF THE INVENTION

Accordingly, an object of the present invention is to provide a technique for detecting an end point of polishing by using a principle other than frictional force or light reflectance.

In order to attain at least part of the above and other related objects of the present invention, there is provided a device for detecting an end point of polishing a substrate, which comprises: a camera configured to obtain a two-dimensional image of a substrate surface targeted for polishing, an image characteristic value calculator configured to calculate a characteristic value for the two-dimensional image by analyzing the two-dimensional image; and a polishing end point determinator configured to determine an end point of polishing on the substrate by using the image characteristic value.

In this device, the two-dimensional image picked up from the substrate surface varies according to its polished state. It is therefore possible to detect an appropriate end point of polishing by using the image characteristic value.

The image characteristic value may be an entropy index value that substantially represents an entropy indicating an amount of information in the two-dimensional image, or a difference statistic index that substantially represents a statistical value regarding pixel value differences in the two-dimensional image.

It is possible to detect an end point of polishing with substantial accuracy by using such characteristic value.

The polishing end point determinator may also determine a time of the end point when the image characteristic value has reached a predetermined threshold value. Alternatively, the determinator may determine a first time point when the image characteristic value has reached a predetermined threshold, and then determine a second time point as the end point after the polishing has been continued for a predetermined time period from the first time point.

By using such determination, an appropriate end point of polishing can be detected in response to the polishing method applied to the substrate.

The present invention can be implemented in various embodiments, such as a method and a device for detecting an end point of polishing a substrate, a method and an apparatus for polishing that uses such detecting method or device, a computer program for implementing the functions of these methods or devices, a recording medium having the computer program recorded thereon, and data signals embodied in a carrier wave containing the computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 2A–2C show a two-step polishing process employed in the present invention.

DESCRIPTION OF THE PREFERRED EMBODIMENT

Preferred embodiments of the present invention are described below in the following order.

Figure 1:
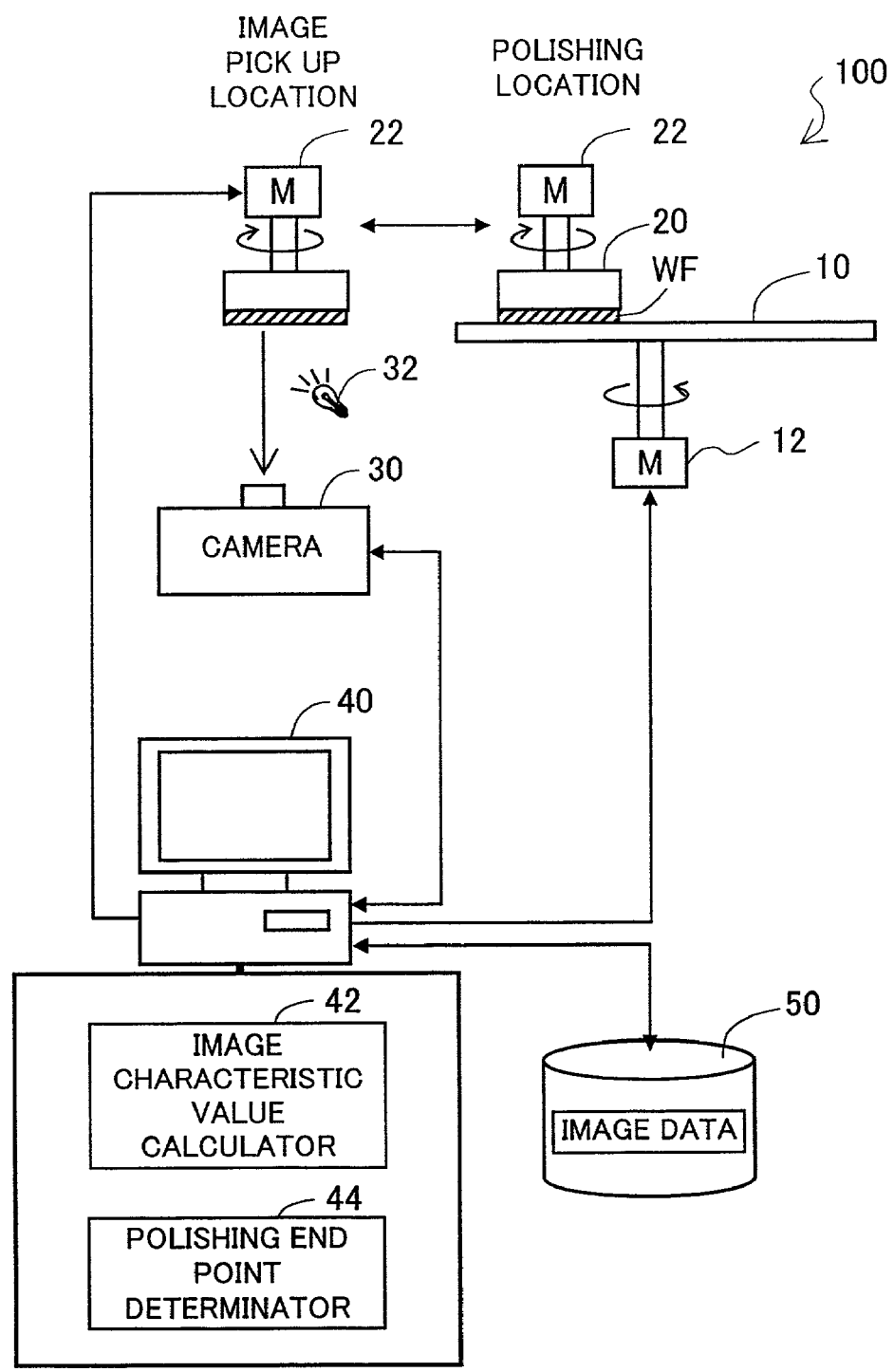
FIG. 1 shows the configuration of a polishing apparatus as one embodiment of the present invention.

A. General structure of the apparatus:
B. Processing procedure in the embodiment
C. Modifications A. General Structure of the Apparatus:

FIG. 1 shows the structure of a polishing apparatus 100 as one embodiment of the present invention. The polishing apparatus 100 comprises: a polishing pad 10, a first motor 12 for rotating the polishing pad 10, a wafer holder 20 for holding a semiconductor wafer WF to push it against the polishing pad 10, and a second motor 22 for rotating the wafer holder 20. The polishing apparatus 100 further comprises: a camera 30 for picking up an image of the wafer surface, a monochromatic light source 32 for illuminating the wafer surface, and a computer 40 for controlling the overall apparatus. The computer 40 is connected with an external storage device 50 for storing image data and computer programs.

The computer 40 functions as an image characteristic value calculator 42 and a polishing end point determinator 44. These various functions are implemented by the computer 40 executing computer programs stored in the external storage device 50. The camera 30 and the computer 40 as a whole constitute a device for detecting a polishing end point.

A wafer WF held by the wafer holder 20 is moved by a transfer mechanism (not shown) to a predetermined location for picking up an image of the wafer surface. The mechanism also transfers the wafer WF to a polishing location for polishing the wafer.

FIG. 2A, 2B, and 2C show a two-stage polishing process employed in the embodiment. As shown in FIG. 2A, a relatively thin TaN layer is formed on an oxide layer of a semiconductor wafer, and a relatively thick Cu layer (a wiring layer) is formed on the TaN layer. There is provided a wiring groove formed in the oxide layer. The TaN layer functions as a stopper film to prevent the Cu (wiring metal) from diffusing into the oxide layer.

In a first polishing process, the Cu layer is polished with a prescribed first chemical abrasive. The first polishing process continues until the surface of the TaN layer emerges. In a second polishing process, the TaN layer is polished with a second chemical abrasive different from the first one. The second polishing process continues until the surface of the oxide layer emerges. As a result, a wiring pattern can be obtained that has the Cu layer remaining only in the wiring groove formed in the oxide layer.

Both of these polishing processes use chemical abrasives and are therefore referred to as CMP (Chemical Mechanical Polishing). The two processes use different abrasives respectively, and different apparatuses are typically used for respective processes. In each of these two polishing processes, a process for detecting a polishing end point is performed according to the present embodiment, as described below. However, it is possible to apply the present embodiment to only one of these two polishing processes.

B. Processing procedure in the Embodiment

Figure 3:
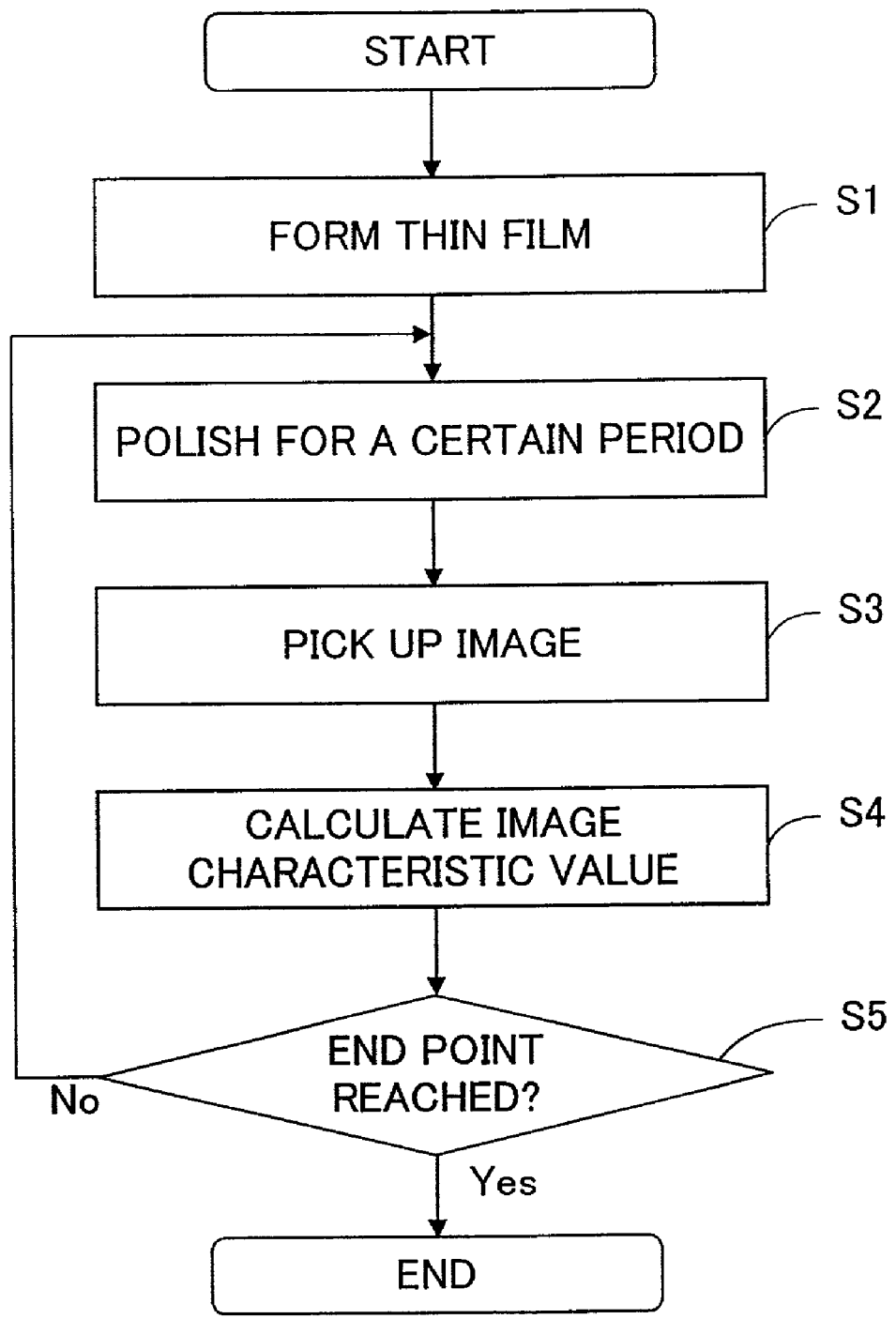
FIG. 3 is a flowchart showing the processing procedures employed in the embodiment.

FIG. 3 is a flowchart showing the processing procedure employed in the embodiment. In step S1, thin films (a TaN layer and a Cu layer) are formed as shown in FIG. 2A. In step S2, polishing is performed for a certain time period by using the polishing apparatus 100 (FIG. 1). In step S3, a semiconductor wafer WF is transferred to the image pickup location (FIG. 1), and the camera 30 picks up a two-dimensional monochromatic multi-level image (simply referred to as "a gray image" hereinafter). In picking up the gray image, the surface of the wafer WF is illuminated with the monochromatic light source 32. The monochromatic light source 32 irradiates light of a certain wave length so that the contrast of the gray image conspicuously varies as the polishing process proceeds. The wave length of this monochromatic light source 32 can be experimentally determined while the optical constants and the thickness of the thin film formed on the wafer surface are taken into consideration.

The gray image is captured in at least one location on the semiconductor wafer WF. However, the gray image is preferably captured in plural locations having different film configurations (such as thickness or wiring pattern).

In steps S4, S5, the image characteristic value calculator 42 (FIG. 1) calculates an image characteristic value by analyzing the gray image. The details of the process will be described later. In step S5, the polishing end point determinator 44 uses the image characteristic value to determine whether or not the polishing has reached a desired end point. The steps S2–S5 are repeated until the polishing reaches the end point.

Figure 4:
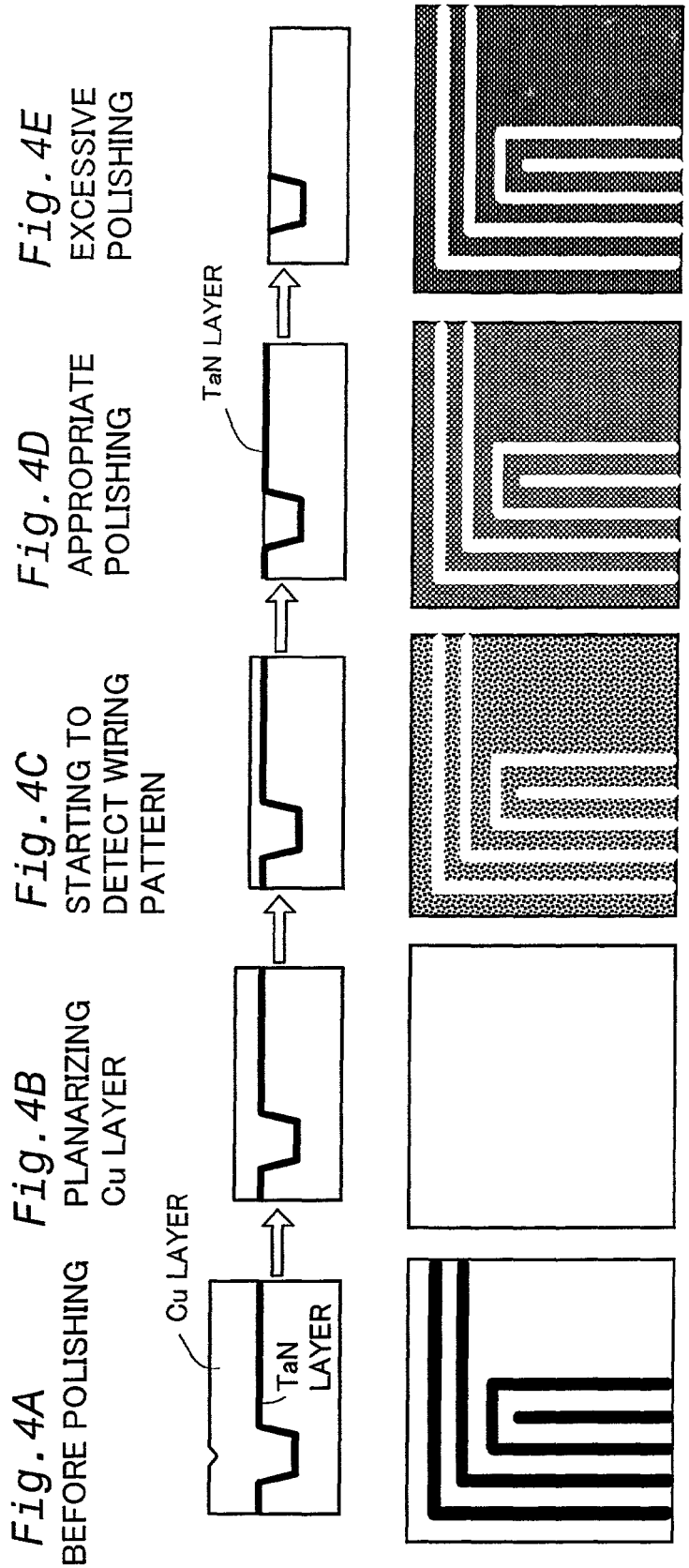
FIGS. 4A–4E show the transformation of cross section of a wafer and a gray image of the wafer surface during the polishing process.

FIGS. 4A–4E show the cross section changes of the wafer and the respective gray images of the wafer surface during the polishing process. As shown in FIG. 4A, a relatively thick Cu layer is formed previous to the polishing, but there is formed a small groove on its surface that is caused by the wiring groove on the TaN layer. The gray image of the wafer surface accordingly includes the image of these grooves, as shown in FIG. 4A.

After the Cu layer is planarized as shown in FIG. 4B, the gray image taken is substantially uniform with less shading. As the polishing proceeds and the Cu layer becomes sufficiently thin, the configuration of the underlying wiring groove (wiring pattern) will be seen through the Cu layer. Accordingly, the brightness of the gray image becomes different between the wiring pattern and the other portions, as shown in FIG. 4C. In an appropriate polishing state where the Cu layer on the TaN layer is perfectly polished away, the wiring pattern of the gray image will be considerably distinct as shown in FIG. 4D. The contrast of the gray image tends to get excessive when the substrate is over-polished as shown in FIG. 4E.

The image characteristic value calculator 42 calculates an image characteristic value that is used for detecting an appropriate end point of polishing, by utilizing such relationship between the polishing state and the gray image. Entropy H1 of the gray image given by the equation (1) can be used for the image characteristic value.

$$H1 = -\sum_{0}^{255} h(i) \times \ln[h(i)] \tag{1}$$

Here i represents a pixel value (0–255) of each pixel in the gray image, and h(i) is a histogram that represents frequency of a pixel value i. The operator ln[ ] represents an operation for obtaining natural logarithm. The histogram h(i) is normalized such that its summation over i has a value of 1. In other words, the histogram h(i) is a probability of appearance of the pixel value i. Suppose the gray image is an information source, the entropy H1 is then an index of an amount of information contained in the source. Accordingly, the entropy H1 tends to get larger as variation of the pixel values in the gray image increases. Since the variation of the pixel values in the gray image is large in the appropriate polishing state (FIG. 4D), an appropriate end point of polishing can be detected by using the entropy H1. In the above equation (1), common logarithm $\log_2[\ ]$ with a base of 2 may also be used instead of natural logarithm ln[ ].

Fuzzy entropy H2 given by the following equations (2a), (2b) may also be used instead of the entropy H1.

$$H2 = \frac{1}{M \times N \times \ln 2} \sum_{0}^{255} Te(i) \times h(i) \tag{2a}$$

$$Te(i) = -\mu(i) \times \ln[\mu(i)] - \{1 - \mu(i)\} \times \ln[1 - \mu(i)] \tag{2b}$$

where $$\mu(x) = 0 \quad x \leq a$$

$$\mu(x) = 2\frac{x-a^2}{c-a} \quad a < x \leq b$$

$$\mu(x) = 1 - 2\frac{x-a^2}{c-a} \quad b < x \leq c$$

$$\mu(x) = 1 \quad c \leq x$$

$$0 \leq a < b < c \leq 255 \text{ and } b = \frac{a+c}{2}$$

Here MxN is size of the gray image in units of number of pixels. Te(i) is a fuzzy member function that defines a fuzzy group and has a shape given by the equation (2b). In the present embodiment, a=0, b=127.5, c=255 are used as coefficients a, b, c that define the fuzzy member function Te(i). The fuzzy entropy H2 also functions as an index of an amount of information in the gray image.

Figure 5:
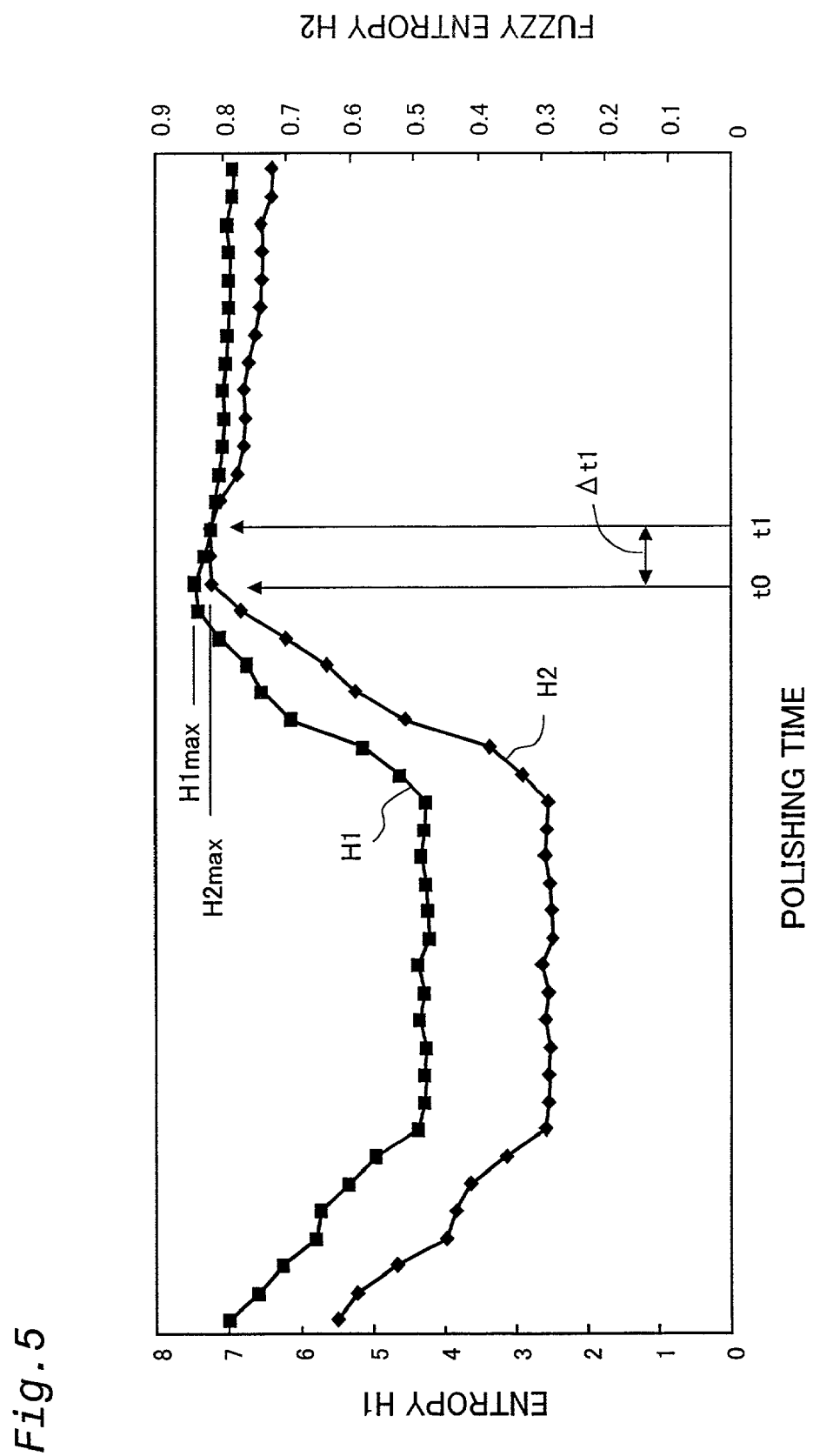
FIG. 5 is a graph showing the time variance of entropies H1, H2 obtained from a polishing experiment.

FIG. 5 is a graph showing the time variance of the entropy H1, H2 obtained in a polishing experiment. The entropy H1 reached its maximum value H1 max at time t0. The entropy H2 also reached its maximum value H2max at time t0. An appropriate polished state was achieved at time t1 after a time period Δt1 elapsed from time t0.

Based on such experimental result, an appropriate polished state can be determined according to several methods as follows.

(C1) An appropriate polished state is to be achieved after the predetermined time period Δt1 elapses from the time t0 where the entropy H1 (or H2) reaches its maximum value.

(C2) An almost appropriate polished state is to be achieved when the entropy H1 (or H2) reaches its maximum value.

By the way, it cannot be known whether or not the entropy H1 has reached its maximum value H1max until the value of the entropy H1 starts to decrease from the maximum value. It is therefore possible to employ other criterions (C3), (C4) as follows, instead of the above criterions (C1), (C2).

(C3) An appropriate polished state is to be achieved when the predetermined time period Δt1 elapses from the time where the entropy H1 (or H2) reaches a predetermined threshold value.

(C4) An almost appropriate polished state is to be achieved when the entropy H1 (or H2) reaches a predetermined threshold value.

It is possible to determine the predetermined threshold value and/or the time period Δt1 for the entropy H1, H2, by performing polishing experiments using test wafers. The test wafers preferably have the same thin film pattern as wafers actually targeted for the end point detection.

With one of the above criterions, an appropriate polishing end point can be easily detected with high accuracy from the entropy H1 or H2 obtained from the analysis of the gray image.

Furthermore, the difference statistics F1–F4 given by the following equations (3a)–(3d) may also be employed instead of the entropy H1, H2.

$$F1 = \sum_{0}^{254} i^2 P(i) \quad (3a)$$

$$F2 = \sum_{0}^{254} P(i)^2 \quad (3b)$$

$$F3 = -\sum_{0}^{254} P(i) \times \ln P(i) \quad (3c)$$

$$F4 = \sum_{0}^{254} i P(i) \quad (3d)$$

Figure 6:
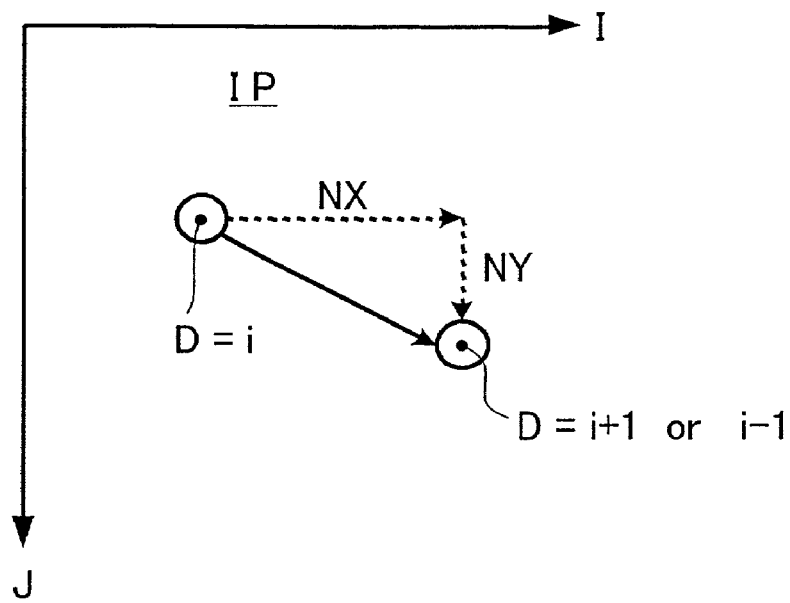
FIG. 6 shows a calculation mode of histograms G(i), P(i) used to calculate a difference statistic of a gray image.

FIG. 6 shows a calculation method of histograms G(i), P(i) used to calculate a difference statistic of a gray image. The histogram G(i) represents a probability that an absolute value of a difference of pixel values D of two pixels has a value of i, wherein the two pixels are separated by (NX, NY). The variable P(i) used in the equations (3a)–(3d) is a histogram given by P(i)=G(i+1). Although any arbitrary value is available as the distance (NX, NY) of two pixels, but in the present embodiment, the pixel value difference is calculated for eight directions, i.e., (NX, NY)=(1, 1), (1, 0), (1, -1), (0, -1), (-1, -1), (-1, 0), (-1, 1), (0, 1), and their average is used as the pixel value difference for the histogram.

A first difference statistic F1 given by the above equation (3a) is a sum of the product of the square of each pixel value difference i and a corresponding histogram value P(i). The statistic F1 corresponds to a dispersion of the pixel value difference i. The first difference statistic F1 is hereinafter referred to as "difference statistic contrast."

A second difference statistic F2 given by the above equation (3b) is a sum of the square of each histogram value P(i) for the pixel value difference i. The second difference statistic F2 is hereinafter referred to as "difference statistic angular second moment."

A third difference statistic F3 given by the above equation (3c) corresponds to an entropy of the histogram P(i). The third difference statistic F3 is hereinafter referred to as "difference statistic entropy."

A fourth difference statistic F4 given by the above equation (3d) corresponds to an average of the pixel value differences i. The fourth difference statistic F4 is hereinafter referred to as "difference statistic average."

Figure 7:
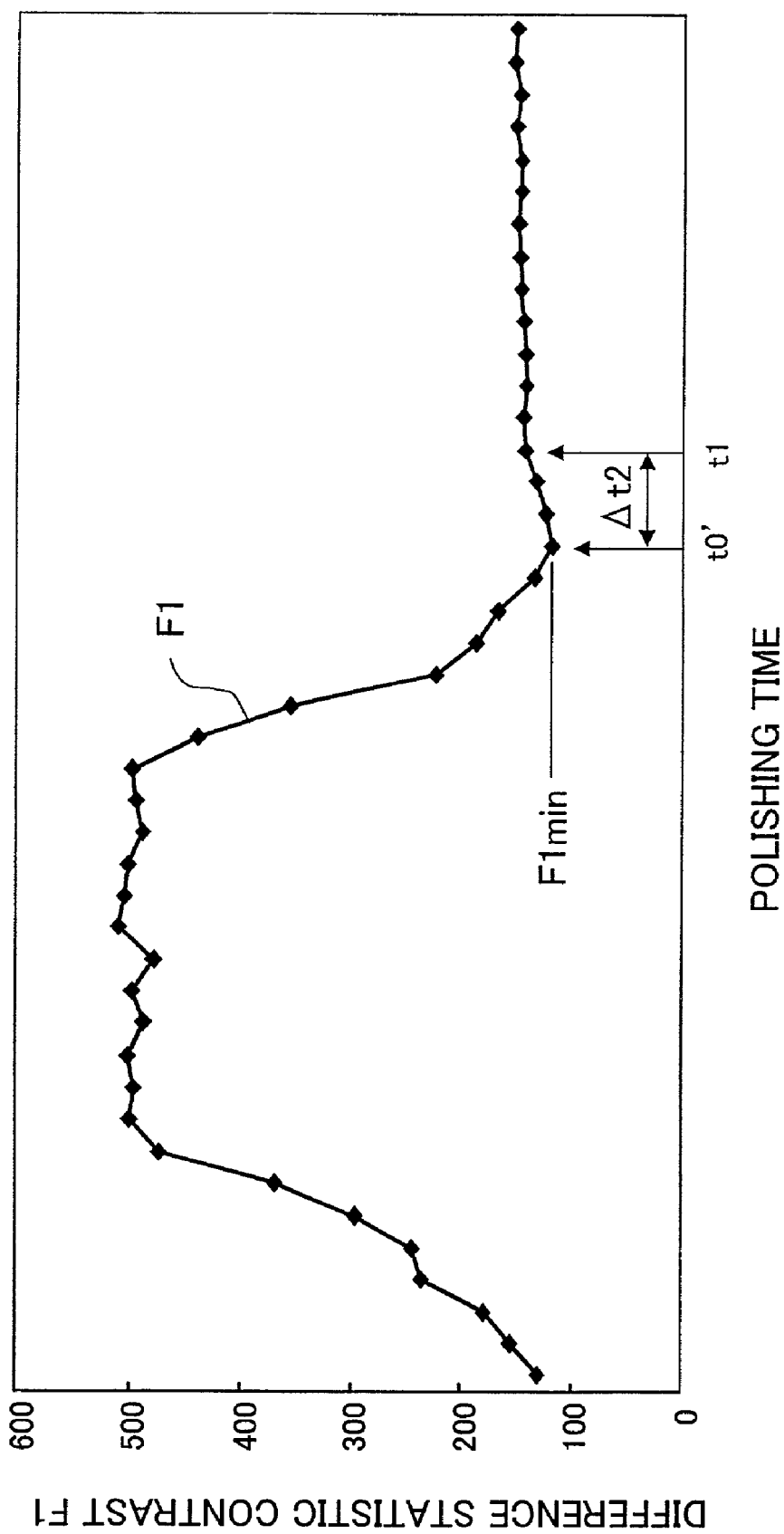
FIG. 7 is a graph showing the time variance of a difference statistic contrast F1 in the same polishing experiment shown in FIG. 5.

FIG. 7 is a graph showing the time variance of the difference statistic contrast F1 in the same polishing experiment as shown in FIG. 5. The difference statistic contrast F1 reached the minimum value F1min at time t0'. An appropriate end point of polishing was achieved at time t1 after a time period Δt2 elapsed from the time t0'.

In case of using the difference statistic contrast F1, it is possible to determine an appropriate polished state according to one of the following criterions (C1')–(C4') that are similar to the criterions (C1)–(C4) described before.

(C1') An appropriate polished state is to be achieved after a predetermined time period Δt2 elapses from the time t0' where the difference statistic contrast F1 reaches its minimum value.

(C2') An almost appropriate polished state is to be achieved when the difference statistic contrast F1 reaches its minimum value.

(C3') An appropriate polished state is to be achieved after the predetermined time period Δt1 elapses from the time where the difference statistic contrast F1 reaches a predetermined threshold value.

(C4') An almost appropriate polished state is to be achieved when the difference statistic contrast F1 reaches a predetermined threshold value.

Similar criterions can be formulated using the other difference statistics F2–F4 instead of the difference statistic contrast F1.

As described above since a predetermined characteristic value, such as entropy H1, H2 or difference statistics F1–F4, is calculated by analyzing a gray image, and then an end point of polishing is detected by using these characteristic values, it is possible to accurately detect an appropriate end point of polishing with a relatively simple configuration.

In the above embodiment, a gray image can be picked up in plural locations as targets for the end point detection on a wafer so that an end point of polishing can be detected by using the image characteristic value in the plural locations. It is accordingly possible to take into consideration the polished states in the plural target locations and to determine whether or not the polishing is performed uniformly, for example. It is also possible to continue the polishing until the wafer is sufficiently polished in particularly important locations, even in the case the polishing is not performed in a uniform way.

Regarding the camera 30, it is preferable to pick up an image by employing a stroboscopic light or with a shuttered camera, in order to pick up an image in synchronous with wafer rotation.

D. Modifications

D1. Modification 1

Although the above embodiment is described with reference to a polishing process of semiconductor wafers, the present invention is not limited to the polishing process of semiconductor wafers, and may be applied to various polishing processes of substrates such as glass substrates for liquid crystal displays, glass substrates for photo masks, and substrates for optical disks. The present invention is also applicable to various types of polishing processes other than CMP.

D2. Modification 2

Although a multi-level monochromatic image is taken as a two-dimensional image in the above embodiment, a multi-level color image may be picked up alternatively. In this case, an image characteristic value may be calculated by obtaining gray gradation values from a color image. Alternatively, image characteristic value may be calculated for each color component of a color image, and an end point of polishing may be detected by using the characteristic values for the respective color components.

D3. Modification 3

Although one of the entropies H1, H2 and the difference statistics F1–F4 is used as an image characteristic value in the above embodiment, other values may also be employed to represent characteristic of the two-dimensional image. However, as can be appreciated from the results shown in FIG. 5 and FIG. 7, there is an advantage that an end point of polishing can be detected with considerable accuracy by using an entropy index substantially representing entropy of an image or a difference statistic index substantially representing a statistic regarding the pixel value differences in the image.

D4. Modification 4

Although an end point of polishing is detected by using one image characteristic value in the above embodiments, a plurality of different image characteristic values may be used alternatively. An end point of polishing can be detected with more accuracy by using plural types of image characteristic values.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for detecting an end point of polishing of a substrate, comprising:
    a camera configured to obtain a two-dimensional image of a substrate surface targeted for polishing;
    an image characteristic value calculator configured to calculate a characteristic value for the two-dimensional image by analyzing the two-dimensional image; and
    a polishing end point determinator configured to determine an end point of polishing of the substrate according to the image characteristic value, wherein
    the image characteristic value is an entropy index that substantially represents an entropy indicating an amount of information in the two-dimensional image.

2. A device for detecting an end point of polishing of a substrate, comprising:
    a camera configured to obtain a two-dimensional image of a substrate surface targeted for polishing;
    an image characteristic value calculator configured to calculate a characteristic value for the two-dimensional image by analyzing the two-dimensional image; and
    a polishing end point determinator configured to determine an end point of polishing of the substrate according to the image characteristic value, wherein
    the polishing end point determinator determines a first time point when the image characteristic value has reached a predetermined threshold value, and determines a second time point as the end point after the polishing has been continued for a predetermined time period from the first time point.

3. A method of detecting an end point of polishing of a substrate, comprising the steps of:
    (a) obtaining a two-dimensional image of a substrate surface targeted for polishing;
    (b) calculating a predetermined characteristic value for the two-dimensional image by analyzing the two-dimensional image; and
    (c) determining an end point of polishing of the substrate according to the image characteristic value, wherein
    the image characteristic value is an entropy index that substantially represents an entropy indicating an amount of information in the two-dimensional image.

4. A method of detecting an end point of polishing of a substrate, comprising the steps of:
    (a) obtaining a two-dimensional image of a substrate surface targeted for polishing;
    (b) calculating a predetermined characteristic value for the two-dimensional image by analyzing the two-dimensional image; and
    (c) determining an end point of polishing of the substrate according to the image characteristic value, wherein the step (c) includes the steps of:
    determining a first time point when the image characteristic value has reached a predetermined threshold value; and
    determining a second time point as the end point after the polishing has been continued for a predetermined time period from the first time point.

5. A computer program product for detecting an end point of polishing of a substrate, comprising
   a computer readable medium; and
   a computer program stored on the computer program medium, the computer program including:
   a first program for causing a computer to obtain a two-dimensional image of a substrate surface targeted for polishing;
   a second program for causing the computer to calculate a predetermined characteristic value for the two-dimensional image by analyzing the two-dimensional image; and
   a third program for causing the computer to determine an end point of polishing of the substrate according to the image characteristic value, wherein the image characteristic value is an entropy index that substantially represents an entropy indicating an amount of information in the two-dimensional image.

6. A computer program product for detecting an end point of polishing of a substrate, comprising
   a computer readable medium; and
   a computer program stored on the computer program medium, the computer program including:
   a first program for causing a computer to obtain a two-dimensional image of a substrate surface targeted for polishing;
   a second program for causing the computer to calculate a predetermined characteristic value for the two-dimensional image by analyzing the two-dimensional image; and
   a third program for causing the computer to determine an end point of polishing of the substrate according to the image characteristic value, wherein the third program includes:
   a program for causing the computer to determine a first time point when the image characteristic value has reached a predetermined threshold value; and
   a program for causing the computer to determine a second time point as the end point after the polishing has been continued for a predetermined time period from the first time point.

* * * * *